J. C. MACKEY.
Lath-Machine.

No. 168,759.

Patented Oct. 11, 1875.

WITNESSES
F. H. Herring
H. F. Norcross

INVENTOR
John C. Mackey
By Gridley & Warner
attys

UNITED STATES PATENT OFFICE.

JOHN C. MACKEY, OF CHICAGO, ILLINOIS.

IMPROVEMENT IN LATH-MACHINES.

Specification forming part of Letters Patent No. 168,759, dated October 11, 1875; application filed November 14, 1874.

*To all whom it may concern:*

Be it known that I, JOHN C. MACKEY, of Chicago, in the county of Cook and State of Illinois, have invented certain new and useful Improvements in Lath-Machines; of which improvements the following is a full, clear, and exact description, which will enable others skilled in the art to which my invention appertains to make and use the same, reference being had to the accompanying drawing, forming a part hereof, and in which—

Figure 1:
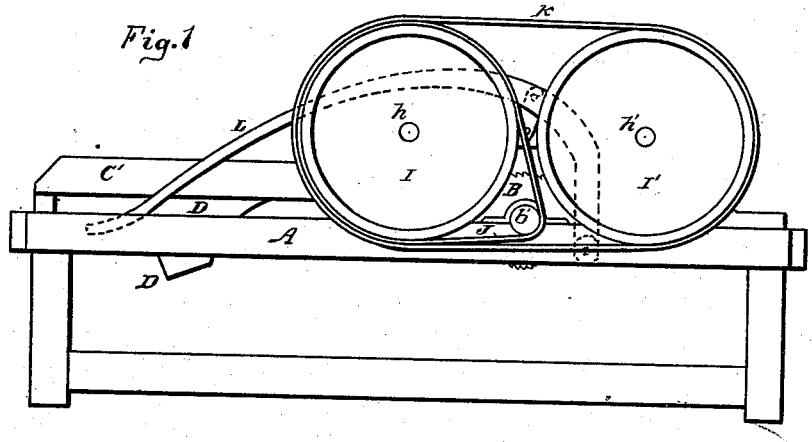
Figure 2:
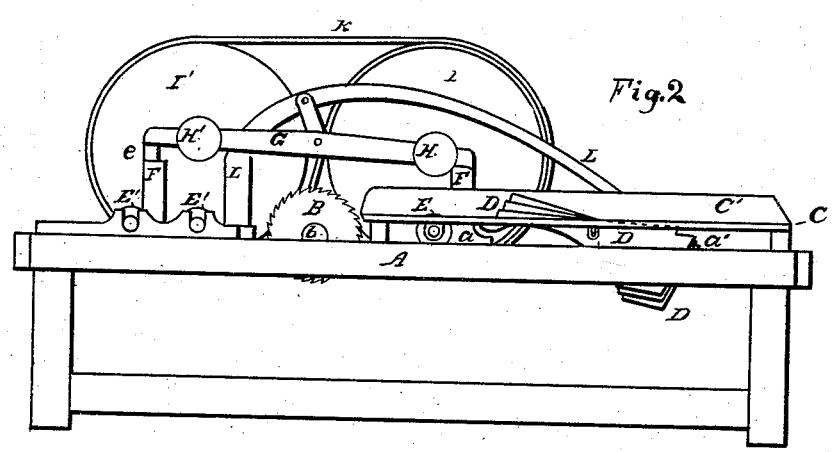
Figure 3:
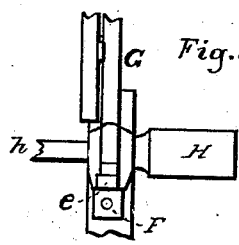
Figure 4:
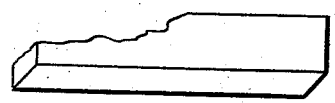

Figure 1 is an elevation of one side of a machine embodying my invention; Fig. 2, a like view of the other side; Fig. 3, a top view of one of the bearings in which a presser-roller rests, and Fig. 4 a like view of an irregularly-formed slab.

Like letters of reference indicate like parts.

This invention relates to that class of lath-machines in which the saw or saws that cut the laths and the feed and delivery rollers all revolve in the same direction; and it consists in the construction and arrangement of driving-pulleys and their belts, with relation to the saws, as to produce the result, as will be fully hereinafter described.

A represents the framing or support of the operating parts of the machine; B, the saws, or gang of circular saws upon saw-arbor $b$, which revolves in proper bearings on frame A, and receives its motion from any convenient driving-power, and has pulley $b'$ on one of its ends. C is the saw-table, upon which the bolt is fed to the saws to be cut into laths. C' is the guide on table C, against which the bolt is guided to the saws. D D are auxiliary gages, to be used when necessary. E is the bottom feed-roller, upon which the bolt bears in being fed to the saws. E' E' are rollers that carry the laths after being sawed. F F are studs to support a horizontal yoke, G, that forms a support and bearings for the upper feed-roller H and upper delivery-roller H'. The yoke G is constructed so as to have a rising and falling motion in studs F, to accommodate the varying thickness of the bolts, and lever L controls or holds the rollers H and H' upon the bolts, whether of one thickness or another. Feed-roller H is fast upon one end of shaft $h$, while at the other end is a large pulley, I, and roller H' is fast to one end of shaft $h'$, upon the opposite end of which is a pulley, I', of the same size in diameter as pulley I. J is a driving-belt around pulley $b'$ on shaft $b$, and passes around large pulley I, and is the driver of pulley I, which revolves in the same direction with pulley $b'$. K is a belt that goes around pulley I and over belt J, thence around pulley I', and is the driver of pulley I', and revolves it in the same direction with pulleys I and $b'$ and saws B.

By this simple arrangement of pulleys and their belts with the saw-arbor the feed-rollers are revolved in the same direction as the saws, which is much cheaper, and requires less power, than the use of gear or crossing of belts to produce the same motion to the parts.

Having thus described my invention, what I claim is—

The combination of the saw-arbor $b$, carrying pulley $b'$, belt J, and pulley I on shaft $h$, with belt K, and pulley I' on shaft $h'$, whereby the rollers H and H' are revolved in the same direction as the saws B, substantially as described.

JOHN C. MACKEY.

Witnesses:
F. F. WARNER,
F. A. HERRING.